(12) United States Patent
Nakamura

(10) Patent No.: US 7,328,854 B2
(45) Date of Patent: Feb. 12, 2008

(54) FLUID CONTROL VALVE AND DROPLET EJECTION DEVICE

(75) Inventor: Shinichi Nakamura, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 534 days.

(21) Appl. No.: 10/976,857

(22) Filed: Nov. 1, 2004

(65) Prior Publication Data

US 2005/0150940 A1 Jul. 14, 2005

(30) Foreign Application Priority Data

Nov. 7, 2003 (JP) .............................. 2003-378146

(51) Int. Cl.
*B05B 15/04* (2006.01)
(52) U.S. Cl. ...................... 239/114; 239/104; 239/569; 347/84; 347/86; 347/92
(58) Field of Classification Search .................. 347/84, 347/85, 86, 87, 92; 239/114, 104, 569; 137/500, 137/503, 501
See application file for complete search history.

(56) References Cited

U.S. PATENT DOCUMENTS

| | | | |
|---|---|---|---|
| 4,570,667 A * | 2/1986 | Masica et al. | ........... 137/115.1 |
| 5,574,485 A * | 11/1996 | Anderson et al. | ............. 347/27 |
| 5,581,285 A * | 12/1996 | Watanabe et al. | ............. 347/45 |
| 5,767,881 A * | 6/1998 | Geissmann | ................... 347/86 |
| 5,927,329 A * | 7/1999 | Yie | ........................ 137/624.13 |
| 6,145,954 A | 11/2000 | Moore | |
| 6,199,582 B1 * | 3/2001 | Matsuzawa et al. | ........ 137/503 |
| 6,209,981 B1 * | 4/2001 | Hirano | ........................... 347/7 |
| 6,270,211 B1 * | 8/2001 | Long et al. | ................... 347/92 |

(Continued)

FOREIGN PATENT DOCUMENTS

CN 1115265 A 1/1996

(Continued)

*Primary Examiner*—Kevin Shaver
*Assistant Examiner*—Trevor McGraw
(74) *Attorney, Agent, or Firm*—Oliff & Berridge, PLC

(57) ABSTRACT

Exemplary embodiments can provide a fluid control valve, which reduces or prevents any bubble from being built up in the valve itself so as to protect other hydraulic equipment placed in a downstream side from having any malfunction due to such a bubble, and a droplet ejection device using the fluid control valve. A fluid control valve includes a tank, through which a fluid passes, an inlet port, through which a fluid flows into the tank, an outlet port, through which a fluid flows out of the tank, a valve plug that opens and closes at least one of the inlet port and the outlet port, a coupler connecting part of the inlet port side, which is located in an inlet passage connected to the inlet port, and a coupler connecting part of the outlet port side, which is located in an outlet passage connected to the outlet port. Piping is connected to the coupler connecting part of the inlet port side and the coupler connecting part of the outlet port side, each by using a coupler. An annular element for the purpose of offsetting a shoulder part caused by a difference in flow passage diameter existing between each of the coupler connecting parts of the inlet port side and outlet port side and the corresponding coupler can be placed at each of the coupler connecting part of the inlet port side and the coupler connecting part of the outlet port side.

11 Claims, 9 Drawing Sheets

U.S. PATENT DOCUMENTS

| | | | |
|---|---|---|---|
| 6,390,611 B1 * | 5/2002 | Kobayashi et al. | 347/84 |
| 6,471,143 B2 * | 10/2002 | Matsuzawa et al. | 239/101 |
| 7,029,094 B2 * | 4/2006 | Nakamura | 347/33 |

FOREIGN PATENT DOCUMENTS

| | | |
|---|---|---|
| GB | 2 278 906 A | 12/1994 |
| JP | A-05-124198 | 5/1993 |
| JP | A-08-318994 | 12/1996 |
| JP | A-10-238645 | 9/1998 |
| JP | A-11-042796 | 2/1999 |
| JP | A-11-268299 | 10/1999 |
| JP | A 2002-148663 | 5/2002 |
| JP | A 2002-213663 | 7/2002 |
| JP | A 2002-310316 | 10/2002 |
| JP | A-2003-211687 | 7/2003 |

* cited by examiner

PRIOR ART

FLUID CONTROL VALVE AND DROPLET EJECTION DEVICE

BACKGROUND OF THE INVENTION

1. Field of Invention

An exemplary embodiment of the present invention relates to a fluid control valve placed in a piping system by using a coupler and a droplet ejection device that uses the fluid control valve.

2. Description of Related Art

Various types of valves can be used as a fluid control valve to turn on and off a flow of fluid. For example, one such valve is equipped with a valve seat formed in a flow passage, and a valve plug either attached to, or detached from, the valve seat in order to control turning on and off of a flow of fluid passing through an internal part of the valve (for example, refer to Japanese Unexamined Patent Publication No. 2002-310316).

In such a fluid control valve, each of an inlet side and an outlet side is usually equipped with a coupler. Then, each of the inlet side and outlet side is connected to piping through its coupler to enable control of turning on and off a flow of fluid passing through the piping. When it comes to installation of the coupler; usually a male screw part 2 is formed on a coupler 1, while a fluid control valve 3 mentioned above is equipped with a coupler connecting part 4, in which a female screw part 5 is formed, and then the male screw part 2 of the coupler 1 is screwed into the female screw part 5 for the installation, as shown in FIG. 7.

If the coupler 1 is fitted into the coupler connecting part 4 of the fluid control valve 3 as described above, and then piping (not illustrated in the drawing), is connected to the coupler, there arises inconvenience as described below.

In the coupler connecting part 4, at the time when the female screw part 5 is manufactured by tapping, usually a non-threaded part 6 that cannot become a part of the female screw part 5 is formed at the bottom of the coupler connecting part 4. As a result, when the coupler 1 is screwed into the coupler connecting part 4, the coupler 1 does not get into at least the non-threaded part 6 in the coupler connecting part 4 so that a great difference in flow passage diameter (inner diameter) is caused between the non-threaded part 6 and a flow passage 7 of the coupler 1, and eventually a large shoulder part 8 comes up in the flow passage.

If the large shoulder part 8 is formed, a bubble 9 trapped in a fluid is likely to get built up before the shoulder part 8 especially at the outlet port side of the fluid control valve 3 as FIG. 7 shows. Then, if once the bubbles 9 being provided in plural numbers are built up they get combined each other to become a large bubble, which eventually flows out into piping through the flow passage 7 of the coupler 1. Thus, there is a chance that other hydraulic equipment placed in a downstream side of the piping may get a malfunction because of the bubble.

It is considered that such building up of bubbles is more likely to happen if an internal part of the fluid control valve 3 is imperfectly filled up with a fluid when the fluid control valve 3 is initially charged with the fluid In the case where the fluid control valve 3 described above is adopted for a supply system for ink and/or a cleaning liquid of a droplet ejection device, which ejects a droplet of a liquid material (ink) onto a substrate, for example, if there exists any bubble in the fluid control valve installed in the ink supply system, the bubble flows out together with the ink into a downstream side and flows into an internal part of a droplet ejection head that ejects a droplet. Then, the bubble impairs stable ejecting operation of the droplet ejection head, and it may eventually cause defective ejection if the impair is remarkable.

Furthermore, if the bubble gets built up in a fluid control valve of the cleaning liquid supply system to become a greater bubble that blocks up the flow passage, the ejection amount of cleaning liquid for cleaning the droplet ejection head becomes uneven so that a nozzle part of the droplet ejection head is not cleaned enough and eventually a stain may remain at the nozzle part. If once a stain remains at the nozzle part in such a manner, ink does not get ejected so as to cause a missing operation of drawing and/or a flying route of ink becomes bent so that quality of initial ejection by the droplet ejection head cannot be secured sufficiently.

Aspects of the invention have been developed, while the circumstances described above are taken into consideration, and one objective of the invention can be to provide a fluid control valve, which prevents or reduces any bubble from being built up in the valve itself so as to protect other hydraulic equipment placed in a downstream side from having any malfunction due to such a bubble, and a droplet ejection device using the fluid control valve.

SUMMARY OF THE INVENTION

In order to attain the objective described above, a fluid control valve of the invention can include a tank, through which a fluid passes, an inlet port, through which a fluid flows into the tank, an outlet port, through which a fluid flows out of the tank, a valve plug that opens and closes at least one of the inlet port and the outlet port, a coupler connecting part of the inlet port side, which is located in an inlet passage connected to the inlet port, and a coupler connecting part of the outlet port side, which is located in an outlet passage connected to the outlet port. Piping can be connected to the coupler connecting part of the inlet port side and the coupler connecting part of the outlet port side each by using a coupler, and an annular element for the purpose of offsetting a shoulder part caused by a difference in flow passage diameter existing between each of the coupler connecting parts of the inlet port side and outlet port side and the corresponding coupler is placed at each of the coupler connecting part of the inlet port side and the coupler connecting part of the outlet port side.

By adopting the fluid control valve, since an annular element for the purpose of offsetting a shoulder part caused by a difference in flow passage diameter existing between each of those coupler connecting parts and the corresponding coupler is placed at each of the coupler connecting part of the inlet port side and the coupler connecting part of the outlet port side, the annular element prevents any bubbles from being built up at the shoulder part, and therefore, it prevents those bubbles from getting integrated each other to become a large bubble to flow out.

Furthermore, it is preferable in the fluid control valve that the annular element is made of synthetic resin. According to this structure, adopting a material, which is particularly excellent in chemical-proof performance, as the synthetic resin increases the number of fluid types for which the fluid control valve can be used so that the fluid control valve becomes excellent in its general versatility. Still further, such a synthetic resin shows higher elasticity than any metallic material for example, and therefore, it also demonstrates a function as a sealing component in addition to another function as a spacer.

Moreover, it is preferable in the fluid control valve that the annular element is so formed that, if there exists a difference in flow passage diameter between at least one of the inlet passage and outlet passage located to be adjacent to the annular element and the corresponding coupler assembled into each of the coupler connecting part of the inlet port side and the coupler connecting part of the outlet port side in which the annular element is placed, a through hole of the annular element is continuously tapered to expand or reduce its diameter without forming any shoulder part between the flow passages. According to this structure, since no shoulder part in passage diameter is caused between each of the inlet and outlet passages and its corresponding coupler's passage by using the annular element so that the diameter expands or reduces continuously, building up of any bubble due to such a shoulder part can be avoided for sure at the coupler connecting part of the inlet port side and the coupler connecting part of the outlet port side.

Moreover, it is preferable in the fluid control valve that the inlet port is positioned to be lower than the outlet port. According to this structure, a fluid flows in through the inlet port that is positioned to be lower than the outlet port, especially when the fluid control valve is initially charged with the fluid. As a result, any gas such as air residing in the tank flows out through the outlet port that is positioned to be higher than the inlet port, and consequently no bubble gets built up in the tank. Accordingly, any inconvenience to be caused by integration of bubbles built up and an outflow of a consequent large bubble can be avoided.

Furthermore, it is preferable in the fluid control valve that the inlet port is positioned at the lowest bottom part of the tank. According to this structure, since the fluid flows in from the lowest bottom part of the tank, there occurs no downward flow of the liquid toward any point lower than the inlet port, and therefore, it does never happen that any bubble circulates in the tank while being carried by a downward flow. Consequently, a bubble is more likely to flow toward the outlet port and not to get built up inside the tank.

Still further, it is preferable in the fluid control valve that the inlet passage is so placed on a tilt as to look up toward the tank. According to this structure, no bubble is built up in the inlet passage and is likely to get built up inside the tank.

Moreover, it is preferable in the fluid control valve that the outlet port is positioned almost around the center part of the top surface of the tank. According to this structure, any bubble gathered to the top surface of the tank is likely to still gather toward the outlet port, being carried by a flow of the fluid, so that the bubble is likely to flow out of the tank, and accordingly not to get built up inside the tank.

Furthermore, it is preferable in the fluid control valve that the top surface of the tank is tilted upward to the outlet port so as to be tapered. According to this structure, any bubble inside the tank moves upwards along the tilt of the top surface of the tank to easily gather around the outlet port so that the bubble is likely to flow out of the tank, and therefore, not to get built up inside the tank.

Still further, it is preferable in the fluid control valve that an internal surface of the tank is provided with surface treatment to become liquid-affinitive. According to this structure, since the internal surface of the tank is made to be highly liquid-affinitive, the liquid easily adheres to the internal surface, and therefore, contrarily any bubble is unlikely to adhere to the internal surface of the tank. Consequently, no bubble is likely to get built up inside the tank.

Moreover, it is preferable in the fluid control valve that an internal surface of the tank is provided with chemical polish treatment. According to this structure, by chemical polish treatment, there does not remain any unevenness such as damages and work surface patterns caused through manufacturing processes, and so forth on the internal surface of the tank. Therefore, no bubble adheres to such unevenness by getting hooked there, and is likely to get built up inside the tank.

A droplet ejection device of the invention can include a droplet ejection head equipped with a nozzle to eject a liquid material, a means for cleaning an area surrounding the nozzle, a cleaning liquid supply section for discharging a cleaning liquid into the device for cleaning, a first supply flow passage for supplying the liquid material to the droplet ejection head, a second supply flow passage for supplying the cleaning liquid to the cleaning liquid supply section, and a fluid control valve for controlling the liquid material flowing through the first supply flow passage as well as the cleaning liquid flowing through the second supply flow passage. The fluid control valve can be a fluid control valve described above.

According to the droplet ejection device, since a fluid control valve described above is used, any large bubble made by combining built up bubbles each other is kept from entering the droplet ejection head and the cleaning liquid supply section. Therefore, using the fluid control valve prevents any defective ejection of the droplet ejection head as well as any insufficient cleaning around the nozzle due to defective ejection of the cleaning liquid of the cleaning liquid supply section.

Therefore, any missing operation of drawing caused by defective ejection of the liquid material and any bend of a flying route of the liquid material caused by insufficient cleaning around the nozzle can be avoided so that quality of initial ejection by the droplet ejection head can be secured sufficiently.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

The following sections explain preferred embodiments of the invention by referring to an exemplary embodiment of the invention.

Figure 1:
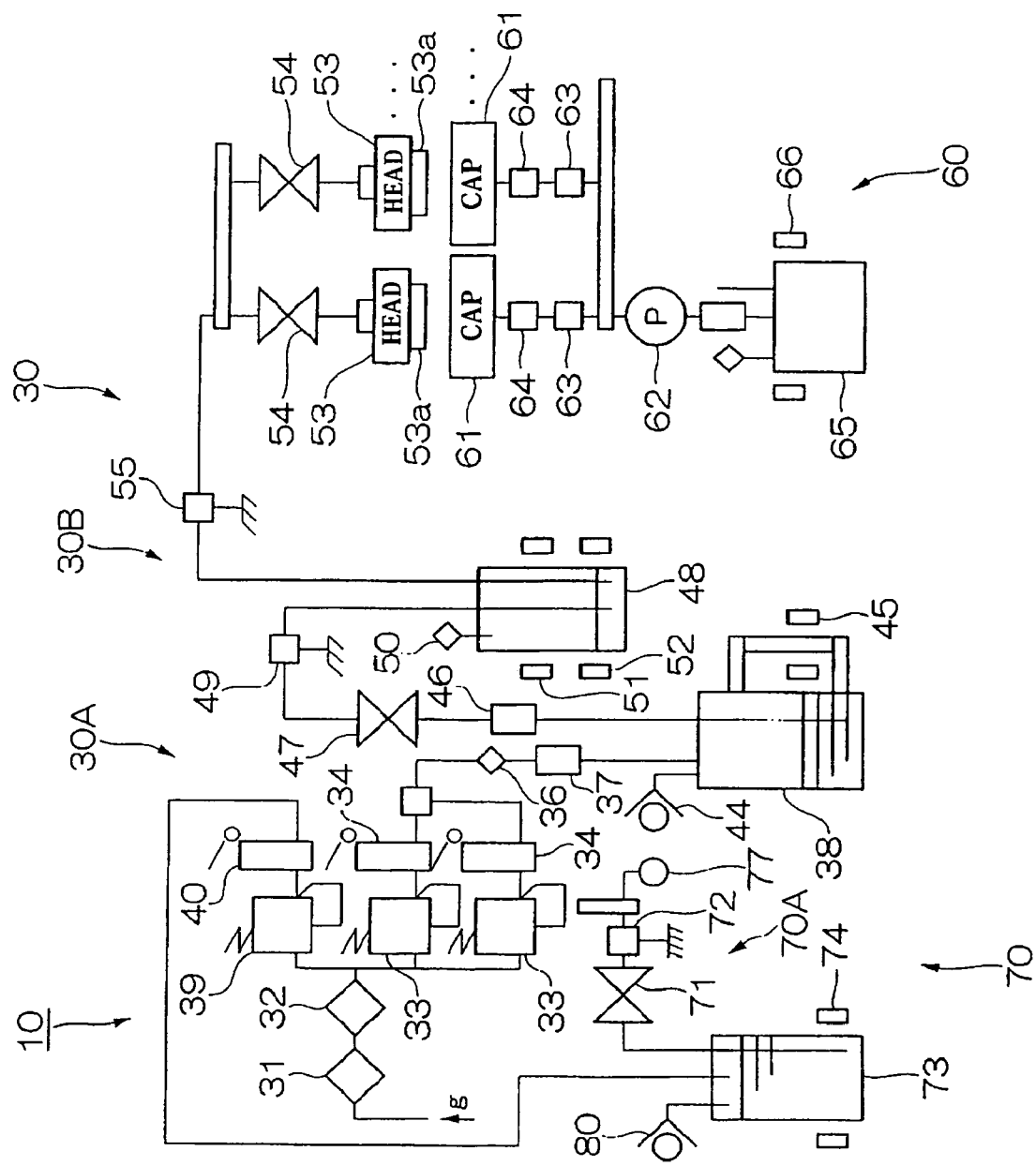
FIG. 1 is a schematic that shows a general structural overview of a droplet ejection device as an exemplary embodiment of the invention.

At first, an embodiment of the droplet ejection device of the invention is explained. FIG. 1 shows a general structural overview of the droplet ejection device in this embodiment, and FIG. 2 is a general structural overview of a missing-dot detection and prevention unit in the droplet ejection device shown in FIG. 1.

Figure 2:
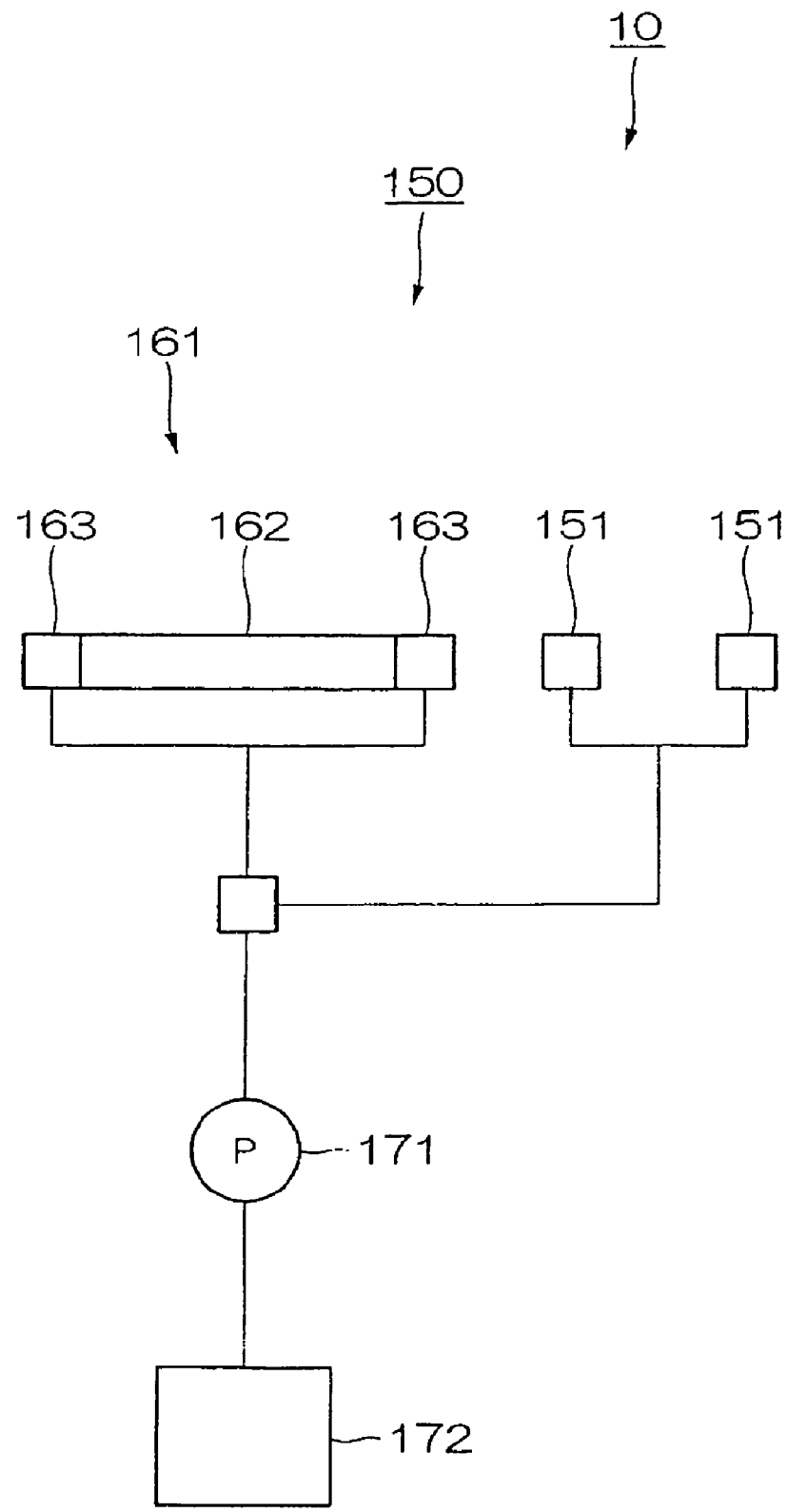
FIG. 2 is a schematic that shows a missing-dot detection and prevention unit of the exemplary embodiment of the present invention.

As shown in FIG. 1 and FIG. 2, a droplet ejection device 10 generally can include a droplet ejection unit 30, a cap unit 60, a wiping unit (cleaning means) 70, and a missing-dot detection and prevention unit 150.

The droplet ejection unit 30 is a unit that ejects an ink droplet "R" from a droplet ejection head 53 and lands the ink droplet at a specified position on a substrate (glass substrate, which is hereinafter called a wafer "Wf"). As shown in FIG. 1, the droplet ejection unit 30 generally comprises: a pressurizing system 30A that supplies inert gas having its pressure as specified, an ink droplet supply system (a first supply flow passage) 30B that introduces an ink droplet to the droplet ejection head 53, and the droplet ejection head 53 that ejects an ink droplet.

In the droplet ejection unit 30, the pressurizing system 30A pressure-regulates inert gas "g" (such as nitrogen gas and so on) to make the inert gas have a pressure as specified, and then supplies the pressure-regulated inert gas "g" to the ink droplet supply system 30B.

At first, the pressurizing system 30A is explained. The pressurizing system 30A is equipped with an air filter 31 and another air filter 36 to remove any foreign substance such as dust contained in the inert gas "g", a mist separator 32 to remove mist, a couple of ink droplet press-transfer pressure regulating valves 33 and a cleaning liquid press-transfer pressure regulating valve 39 to regulate the corresponding pressure appropriately, a couple of residual pressure exhaust valves at the ink droplet side 34 and a residual pressure exhaust valve at the cleaning liquid side 40, and an inert gas pressure detection sensor 37 to measure the pressure of the inert gas "g".

In the pressurizing system 30A that has a structure as described above, the inert gas "g" such as nitrogen gas and the like can be supplied to the air filter 31 at first, and then any foreign substance contained in the inert gas "g" is removed. Subsequently, the inert gas "g" is treated in the mist separator 32 to remove the mist that the inert gas "g" contains.

The inert gas "g", from which any foreign substance and mist have been removed, is transferred to either the ink droplet supply system 30B or a cleaning liquid supply system (a second supply flow passage) 70A to be described later, according to work duty contents of the droplet ejection device 10. Switching either to the ink droplet supply system 30B or to the cleaning liquid supply system 70A is carried out by alternately turning on and off an ink liquid press-transfer ON/OFF switching valve (a fluid control valve) 47 and a cleaning liquid ON/OFF switching valve (a fluid control valve) 71, both of which are described later. In this embodiment, a fluid control valve of the present invention is used as an ON/OFF switching valve, especially for each of the cleaning liquid ON/OFF switching valve 71 and a head bubble elimination valve 54, to be described below, among those switching valves described above. Also, a fluid control valve of the invention can also be adopted for the ink liquid press-transfer ON/OFF switching valve 47, as a matter of course.

When the inert gas "g" is press-transferred into the ink droplet supply system 30B by turning on the ink liquid press-transfer ON/OFF switching valve 47 and turning off the cleaning liquid ON/OFF switching valve 71, the inert gas "g" is supplied to the ink droplet press-transfer pressure regulating valve 33 to be pressure-regulated so as to have a pressure as specified. Then, the pressure-regulated inert gas "g" passes through the residual pressure exhaust valve at the ink droplet side 34 and the air filter 36, and the supply pressure of the inert gas is checked by the inert gas pressure detection sensor 37, and subsequently the inert gas is supplied to an ink liquid pressurizing tank 38.

Meanwhile, when the inert gas "g" is press-transferred into the cleaning liquid supply system 70A by turning off the ink liquid press-transfer ON/OFF switching valve 47 and turning on the cleaning liquid ON/OFF switching valve 71, the inert gas "g" is supplied to the cleaning liquid press-transfer pressure regulating valve 39 to be pressure-regulated so as to have a pressure as specified. Then, the pressure-regulated inert gas "g" passes through the residual pressure exhaust valve at the cleaning liquid side 40, and the inert gas is supplied to a cleaning liquid pressurizing tank 73. Furthermore, the supply pressure of the inert gas is checked by the inert gas pressure detection sensor.

Next, the ink supply system 30B is explained. The ink supply system 30B generally comprises: the ink liquid pressurizing tank 38 to reserve an ink droplet, a main tank 48, an ink liquid press-transfer pressure detection sensor 46 to measure the pressure of the ink droplet, the ink liquid press-transfer ON/OFF switching valve 47 to control the press-transfer of the ink droplet, the head bubble elimination valve 54 to be used for eliminating any bubble inside the droplet ejection head 53.

The ink liquid pressurizing tank 38 is equipped with a tank pressure exhaust valve 44 to release any excessive pressure out of the tank, and an ink liquid presence detection sensor 45 for checking to see if the amount of the ink droplet is enough as required, by detecting a liquid level of the ink droplet. Thus, for example, if the remaining ink volume becomes less than the required level in the ink liquid pressurizing tank 38, the ink liquid presence detection sensor 45 detects the condition and subsequently an ink liquid is added into the ink liquid pressurizing tank 38 according to the detection signal.

The main tank 48 is equipped with an air filter 50, a main tank upper limit detection sensor 51, and an ink liquid level control detection sensor 52. According to this structure, for example, if the ink liquid level inside the main tank 48 exceeds the specified level, the main tank upper limit detection sensor 51 detects the condition and subsequently the supplying operation of an ink droplet to the main tank 48 will be stopped according to the detection signal. Incidentally, the ink liquid level control detection sensor 52 is a detection sensor for regulating an liquid level head value "head" of the ink liquid in the main tank 48 for each nozzle surface 53a of the droplet ejection heads 53 provided in plural numbers within a specified range (for example, 25 mm±0.5 mm).

Furthermore, a flow passage earth coupling 49 (i.e., grounding) is placed for the purpose of electrostatic-discharging between the ink liquid press-transfer ON/OFF switching valve 47 and the main tank 48, while another flow passage earth coupling 50 is placed for the same purpose of electrostatic-discharging between the main tank 48 and the head bubble elimination valve 54.

Under the structure described above, if the inert gas "g" is supplied to the ink liquid pressurizing tank 38 of the ink supply system 30B, the inert gas "g" presses the ink liquid level downward so as to press-transfer the ink liquid out of the ink liquid pressurizing tank 38. Then, pressure of the press-transferred ink liquid is measured by the ink liquid press-transfer pressure detection sensor 46. Then, the press-transferred ink liquid passes through the ink liquid press-transfer ON/OFF switching valve 47, and the press-transferred ink liquid is supplied to the main tank 48.

The ink liquid supplied to the main tank 48 is further supplied via the head bubble elimination valve 54 up to the droplet ejection heads 53. The head bubble elimination valve 54 closes an upper flow passage to each of the droplet ejection heads 53 to increase the vacuumed flow speed of the ink liquid, at the time when the ink liquid residing in the droplet ejection heads 53 is vacuumed by the cap unit 60 to be described below so that any bubble inside the droplet ejection heads 53 is exhausted more quickly.

Figure 3A:
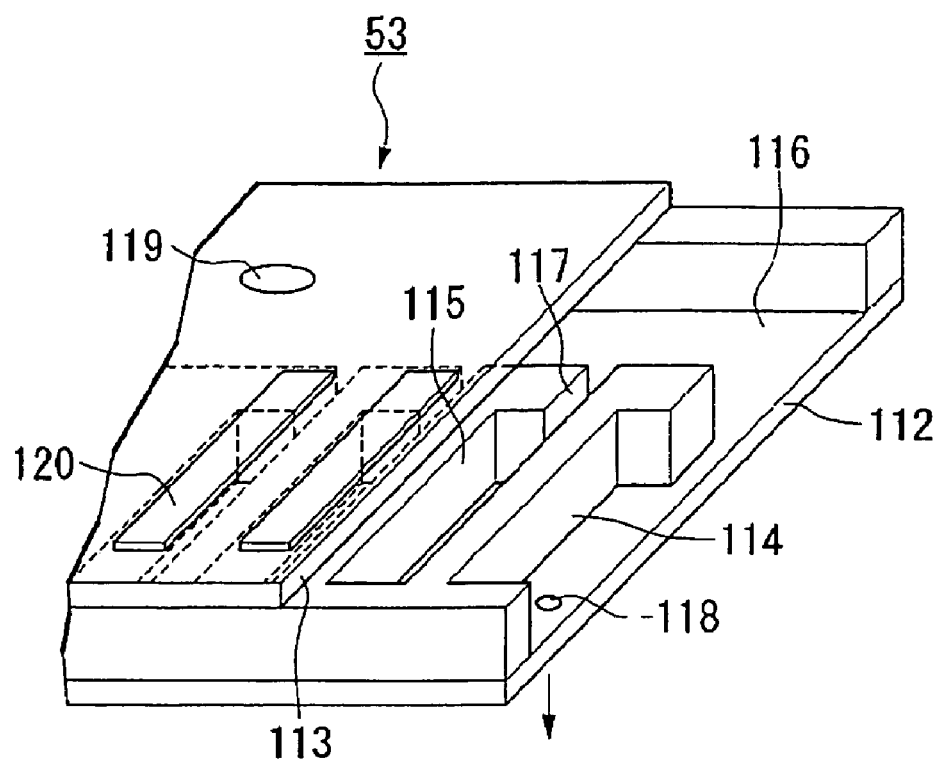
FIGS. 3(a) and 3(b) are schematics that show a droplet ejection head of the exemplary embodiment of the invention.
Figure 3B:
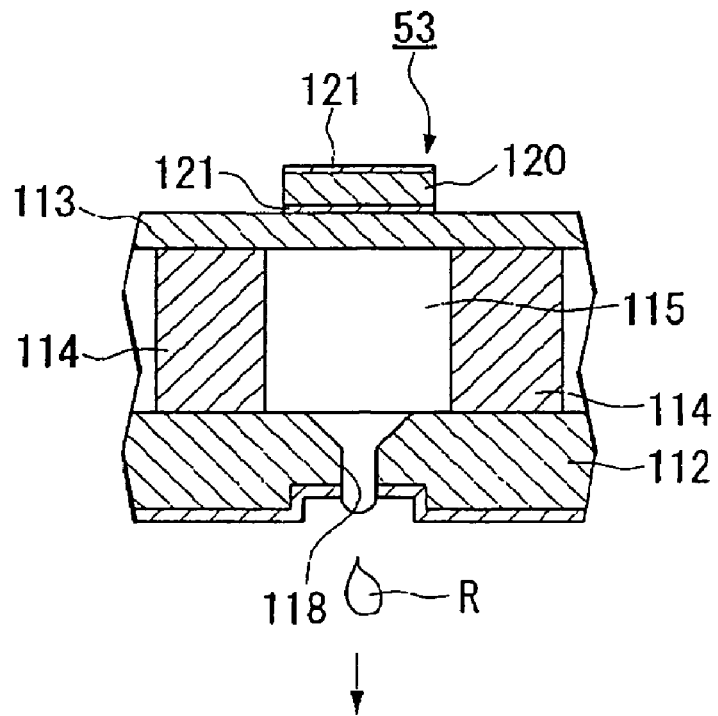

Next, the droplet ejection heads 53 are explained. FIG. 3a and FIG. 3b show general exemplary structural overviews of a droplet ejection head.

In this exemplary embodiment, especially an inkjet method is adopted as a droplet ejection method. This inkjet method uses a mechanism, in which a stainless nozzle plate 112 and a vibration plate 113 are provided and these two parts are connected with a partition material (reservoir plate) 114 as FIG. 3a shows for example, for each of the droplet ejection heads 53. Between the nozzle plate 112 and the vibration plate 113, a plurality of cavities 115 and a reservoir 116 are formed by the partition material 114, and the cavities 115 and the reservoir 116 are linked together with a flow passage 117.

Inner sections of each of the cavities 115 and the reservoir 116 are filled with a liquid material (ink liquid) to be ejected, and the flow passage 117 functions as a supply port to supply the liquid material from the reservoir 116 to the cavities 115. Furthermore, the nozzle plate 112 is provided with a plurality of hole-shaped nozzles 118, to be used for ejecting the liquid material out of the cavities 115, while the nozzles being formed in a lengthwise as well as crosswise arrangement. Meanwhile, a hole 119 that opens into the reservoir 116 is formed in the vibration plate 113, and a pipe (not illustrated in the drawing) connected to the head bubble elimination valve 54 is to be connected to the hole 119.

Furthermore, onto a surface of the vibration plate 113 that is opposite to the surface facing the cavities 115, a piezo electric element (piezo element) 120 is attached as FIG. 3b shows. The piezo element 120 is sandwiched between a couple of electrodes 121, and it is structured to bend and protrude outward when being electrified. Thus, the piezo element functions as a device that ejects in the invention.

The vibration plate 113, to which the piezo element 120 is attached in the condition described above, gets unified with the piezo element 120 and bends outwards together at the time when the piezo element bends, so that the volume of the cavities 115 increases.

Internal spaces of the cavities 115 and the reservoir 116 are linked together. Therefore, if the reservoir 116 is filled with the liquid material, a certain amount of the liquid material, whose volume corresponds to the increased volume of the cavities, flows into the cavities 115 through the flow passage 117 from the reservoir 116.

Subsequently, if electrifying the piezo element 120 gets interrupted under the condition, the piezo element 120 and the vibration plate 113 become restored together as they were. As a result, the capacity of the cavities 115 also becomes restored as it was, and the liquid pressure inside the cavities 115 increases so that a droplet 122 of the liquid material is ejected from the nozzles 118.

Moreover, as an ejection method of the droplet ejection head, any other method can be applied in addition to the electro-to-mechanical conversion device method described above using the piezo electric element (piezo element) 120. For example, what can be applied includes, a method in which an electro-to-thermal conversion device is used as an energy generation element, a continuous method such as an electro-charge control type and a pressure-vibration type, an electro-static attraction method, and a method in which an electromagnetic wave such as laser is applied for heating up to eject a liquid material by the generated heat.

Next, the cap unit 60 is explained. As shown in FIG. 1, the cap unit 60 generally can include a cap 61 that is pressed against the droplet ejection heads 53, a liquid suction pump 62 to suck the ink liquid, a liquid recycling tank 65 to reserve the sucked ink liquid, a needle valve 63 to be used for regulating the sucking pressure, and a droplet suction pressure detection sensor 64.

The liquid recycling tank 65 is equipped with a recycling tank upper limit detection sensor 66. For example, if the liquid level inside the liquid recycling tank 65 exceeds the specified level, the recycling tank upper limit detection sensor 66 detects the condition, and then, the ink liquid inside the liquid recycling tank 65 is transferred to a recycling process according to the detection signal.

When the cap unit 60 having such a structure described above is used, the cap 61 can be pressed against the nozzle surface 53a of each of the droplet ejection heads 53 from a position just underneath before ejection of the ink droplet "R" out of each of the droplet ejection heads 53. Then, by making use of vacuum force of the liquid suction pump 62, each nozzle of the droplet ejection heads 53 is supplied with a negative pressure in order to fill the droplet ejection heads 53 with the droplet up to the nozzle surface 53a, and furthermore, each nozzle of the droplet ejection heads 53 is supplied with a negative pressure to suck the nozzle for the purpose of preventing it from clogging up. Still further, during a stand-by period when being out of manufacturing operation, the nozzle surface 53a is covered with the cap 61 in order to keep moisture retention for the purpose of preventing the droplet inside the nozzle from getting dried.

Figure 4:
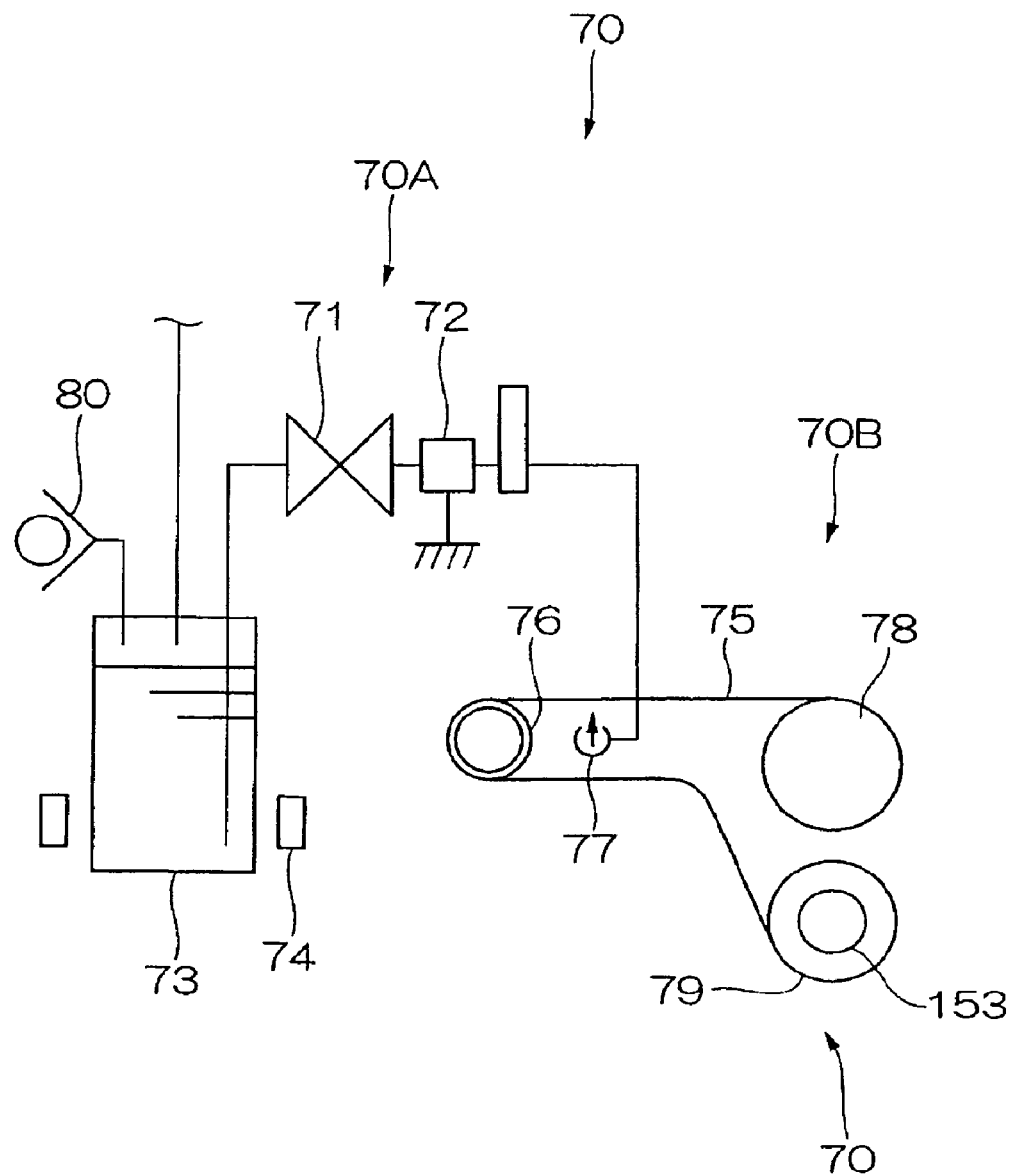
FIG. 4 is a schematic of a wiping unit of the exemplary embodiment of the present invention.

Next, the wiping unit 70 is explained. FIG. 4 is a drawing to show a general structure of the wiping unit. The wiping unit 70 shown in FIG. 1 and FIG. 4 collectively cleans the nozzle surface 53a of each of the droplet ejection heads 53 at regular time intervals and/or any time as required, and the wiping unit generally can include the cleaning liquid supply system 70A that supplies a cleaning liquid, and a nozzle surface cleaning system 70B that cleans the nozzle surface 53a.

The cleaning liquid supply system 70A is composed of the cleaning liquid pressurizing tank 73 for storing the cleaning liquid, the cleaning liquid ON/OFF switching valve 71 for controlling the cleaning liquid flow, as well as a cleaning liquid supply section 77 for spraying the cleaning liquid on a wiping sheet 75, to be described later. Between the cleaning liquid ON/OFF switching valve 71 and the cleaning liquid supply section 77, a flow passage earth coupling 72 is placed for the purpose of electrostatic-discharging from the flow passage. The cleaning liquid pressurizing tank 73 is equipped with a cleaning liquid presence detection sensor 74, which checks to see if the amount of the cleaning liquid is enough as required by detecting a liquid level of the cleaning liquid, and a tank pressure exhaust valve 80 to release any excessive pressure out of the tank. For example, if the remaining cleaning liquid volume becomes less than the required level in the cleaning liquid pressurizing tank 73, the cleaning liquid presence detection sensor 74 detects the condition and subsequently an cleaning liquid is added into the cleaning liquid pressurizing tank 73 according to the detection signal.

As shown in FIG. 4, the nozzle surface cleaning system 70B is, in its structure, equipped with the wiping sheet 75 that wipes each nozzle surface 53a, a roller 76 that presses the wiping sheet 75 against each nozzle surface 53a, an unwinding roller 78 that feeds the wiping sheet 75, a winding roller 79 for winding up the wiping sheet 75 after the wiping sheet wipes each nozzle surface 53a, and an electric motor 153 to drive the winding roller 79. Incidentally, as the wiping sheet 75, a textile cloth of polyester 100% is preferably used for example. Furthermore, a roller 76 is a rubber roller, being provided with elasticity that enables repulsion for pressing a peripheral objective.

According to operation of the cleaning liquid supply system 70A of the wiping unit 70, the pressure-regulated inert gas "g" is supplied to the cleaning liquid pressurizing tank 73, as described above. As a result, the cleaning liquid pressurizing tank 73 is pressurized so that the cleaning liquid stored in the tank is press-transferred through the cleaning liquid ON/OFF switching valve 71 to the cleaning liquid supply section 77 and eventually sprayed onto the wiping sheet 75.

According to operation of the nozzle surface cleaning system 70B, the wiping sheet 75 being unwound from the unwinding roller 78 is supplied toward each nozzle surface 53a and can be pressed against the nozzle surface by the roller 76, while each nozzle surface 53a is always supplied with a fresh cleaning surface of the wiping sheet 75. Furthermore, since the structure is so made as to press the wiping sheet 75 against each nozzle surface 53a by pressing force of the roller 76, the cleaning surface can get touched to each nozzle surface 53a for sure too.

Next, the missing-dot detection and prevention unit 150 is explained.

The missing-dot detection and prevention unit 150 is used to check each of the droplet ejection heads 53 for clogging and to prevent such clogging. As shown in FIG. 2, the missing-dot detection and prevention unit 150 generally can include a missing-dot detection section 151, a missing-dot prevention section 161, a suction pump 171 connected to the missing-dot detection section 151 and the missing-dot prevention section 161, and a waste liquid tank 172 for storing ink liquid sucked by the suction pump 171.

The missing-dot detection section 151 is internally equipped with a laser unit (not illustrated in the drawing) to launch a laser beam, and a laser detecting unit (not illustrated in the drawing) to detect the launched laser.

The missing-dot prevention section 161 generally can include a table 162, on which the wafer "Wf" is placed, and a reserve ejection section 163 located at an edge section of the table 162.

According to operation of the missing-dot detection section 151 of the missing-dot detection and prevention unit 150, each of the droplet ejection heads 53 are moved to and positioned above the missing-dot detection section 151. Then, an ink droplet as a dummy one is so ejected from each of the droplet ejection heads 53 as to block off a laser beam launched from the laser unit (not illustrated in the drawing) so that the missing-dot inspection can be implemented through the operation.

For example, if the laser detecting unit (not illustrated in the drawing) keeps on detecting a laser beam though ejecting an ink droplet as a dummy has been commanded, it is judged that the nozzle is clogging up and no droplet is ejected so that a missing-dot part may come up in a product. Then, for the nozzle judged to have a possibility of missing-dot, treatment of sucking and removal of clogging up is implemented by the cap unit 60.

According to operation of the missing-dot prevention section 161, each of the droplet ejection heads 53 can be moved to and positioned above the reserve ejection section 163 before ejecting an ink droplet onto the wafer "Wf". Then, an ink droplet can be ejected as reserve ejection (flashing) from each of the droplet ejection heads 53. In other words, at an early stage of ejection when flying motion of an ink droplet is uncertain, the ink droplet is ejected as reserve ejection onto the reserve ejection section 163. Then, an ink droplet can be ejected onto the wafer "Wf" after flying motion of the ink droplet becomes certain. As a result, any missing-dot and any bend of a flying route of the ink droplet can be avoided.

Next, the cleaning liquid ON/OFF switching valve 71 and the head bubble elimination valve 54, by which this exemplary embodiment is characterized, are explained. However, since the structure, operation, and effect of the cleaning liquid ON/OFF switching valve 71 are almost the same as those of the head bubble elimination valve 54, only the head bubble elimination valve 54 is explained here and any description on the cleaning liquid ON/OFF switching valve 71 is omitted.

Figure 5:
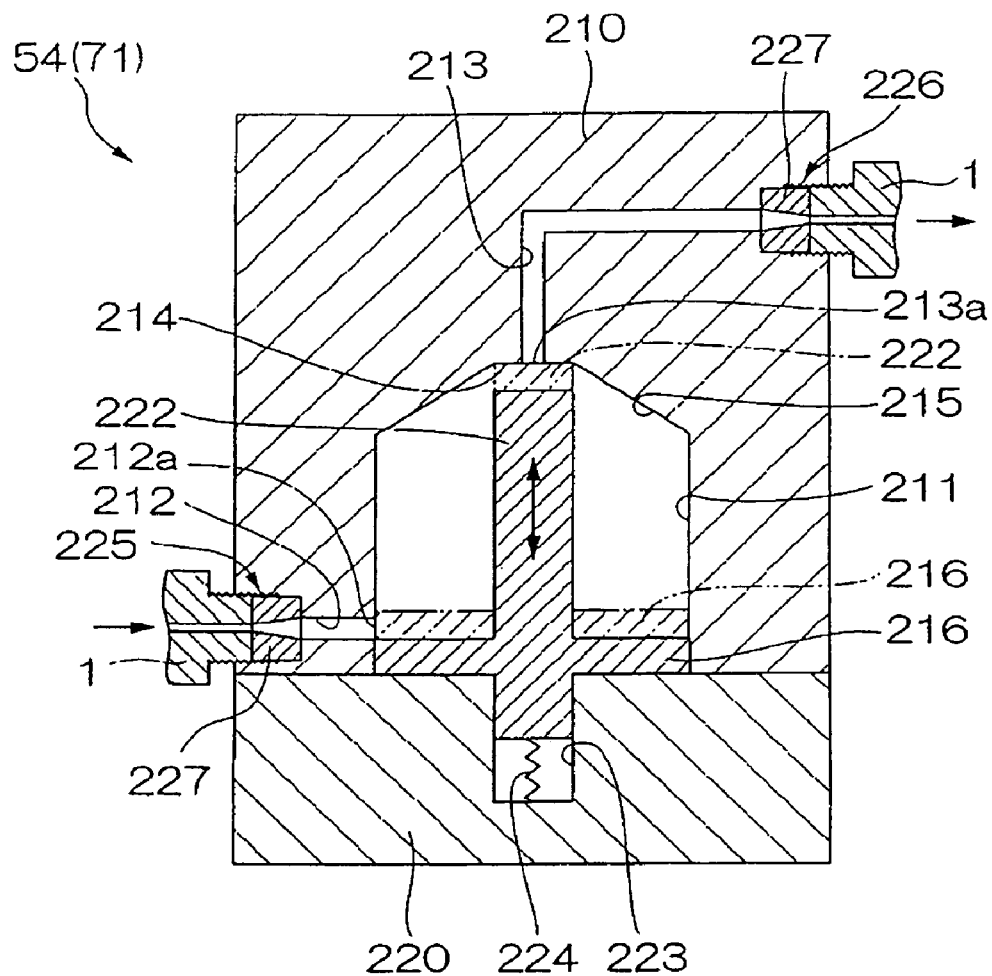
FIG. 5(a) is a sectional side-view that shows a general structural overview of a head bubble elimination valve (fluid control valve) with a valve plug in a lifted position.
FIG. 5(b) is a sectional side-view that shows a general structural overview of a head bubble elimination valve (fluid control valve) with a valve plug in a lowered position.
Figure 5A:
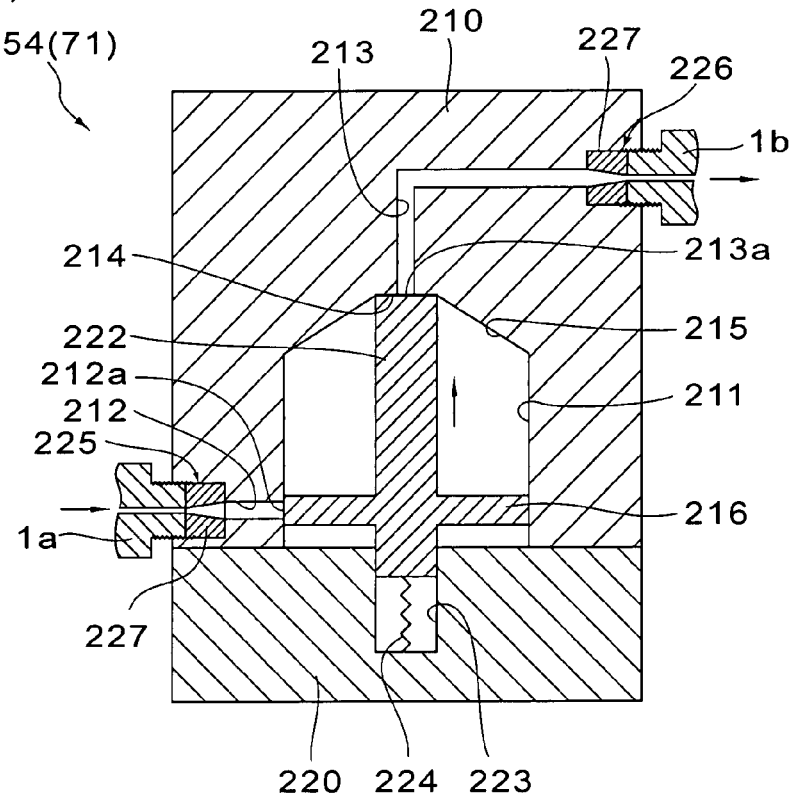
Figure 5B:
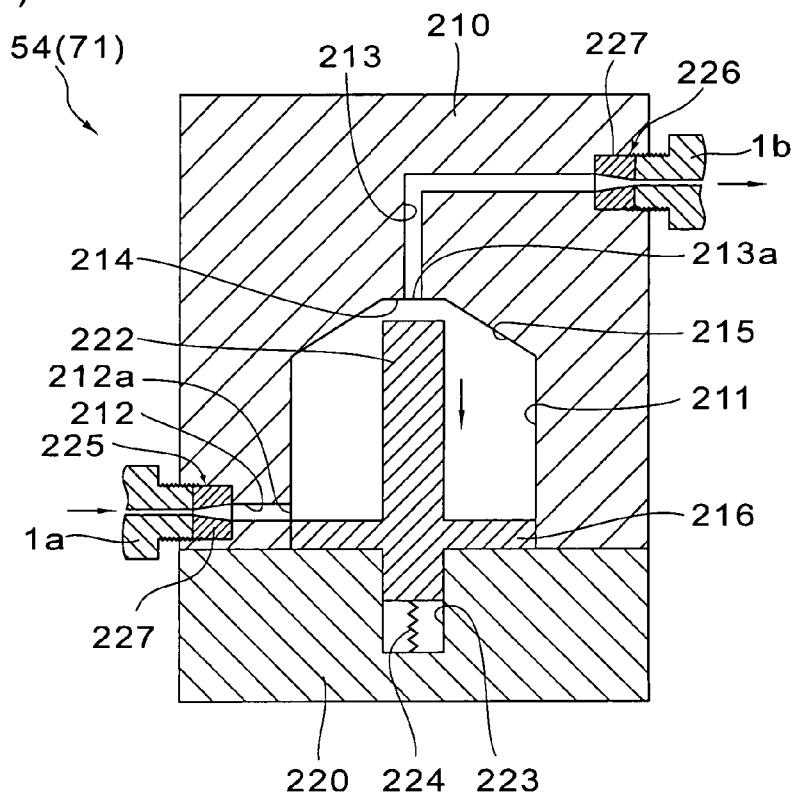

FIGS. 5(a) and 5(b) show a general structural overview of an exemplary head bubble elimination valve 54. In FIG. 5(a), the valve plug 222 is in a turned-off condition of the head bubble elimination valve 54. In FIG. 5(b), the valve plug is in a turned-on condition of the head bubble elimination valve 54.

The head bubble elimination valve 54 is composed of an upper body part 210 and a lower body part 220 in combination that are, for example, made of stainless steel, such as SUS316. Formed in the upper body part 210, there are a tank 211 that opens its space toward the lower body part 220, an inlet passage 212 led to a side section bottom part of the tank 211, which is namely a side section bottom part of a space working as a flow passage that allows a fluid (a liquid material) to pass through as the tank 211, and an outlet passage 213 led to around a center part of the top surface of the tank 211.

The lower body part 220 is equipped with a valve plug 222 that is attached to or detached from a valve seat 214 while being accompanied by a flexible open/close part 216, a valve plug holding part 223 in which the valve plug 222 slides and moves, a spring 224 that is placed at a bottom of the valve plug holding part 223 and helps the valve plug 222 to get pulled downward, and an air supply section (not illustrated in the drawing) to supply the valve plug holding part 223 with air for driving the valve plug 222.

In the top surface of the tank 211, the valve seat 214, to which the valve plug 222 is to get attached, is formed around an outlet port 213a of the outlet passage 213, and a taper section 215, tilted upward to the valve seat 214, is formed around the valve seat 214. Furthermore, an inlet port 212a of the inlet passage 212 is formed at the side section bottom part of the tank 211. The inlet port 212a gets opened and closed according to a vertical motion of the open/close part 216 incident to a vertical motion of the valve plug 222, as described below. Moreover, an internal surface of the tank 211 is provided with chemical polishing (electrolysis polishing) by using a chemical material that can dissolve the material of the upper body part 210 (stainless steel in this embodiment) in order to remove any unevenness such as work surface patterns caused through manufacturing processes on the internal surface of the tank 211.

Figure 8:
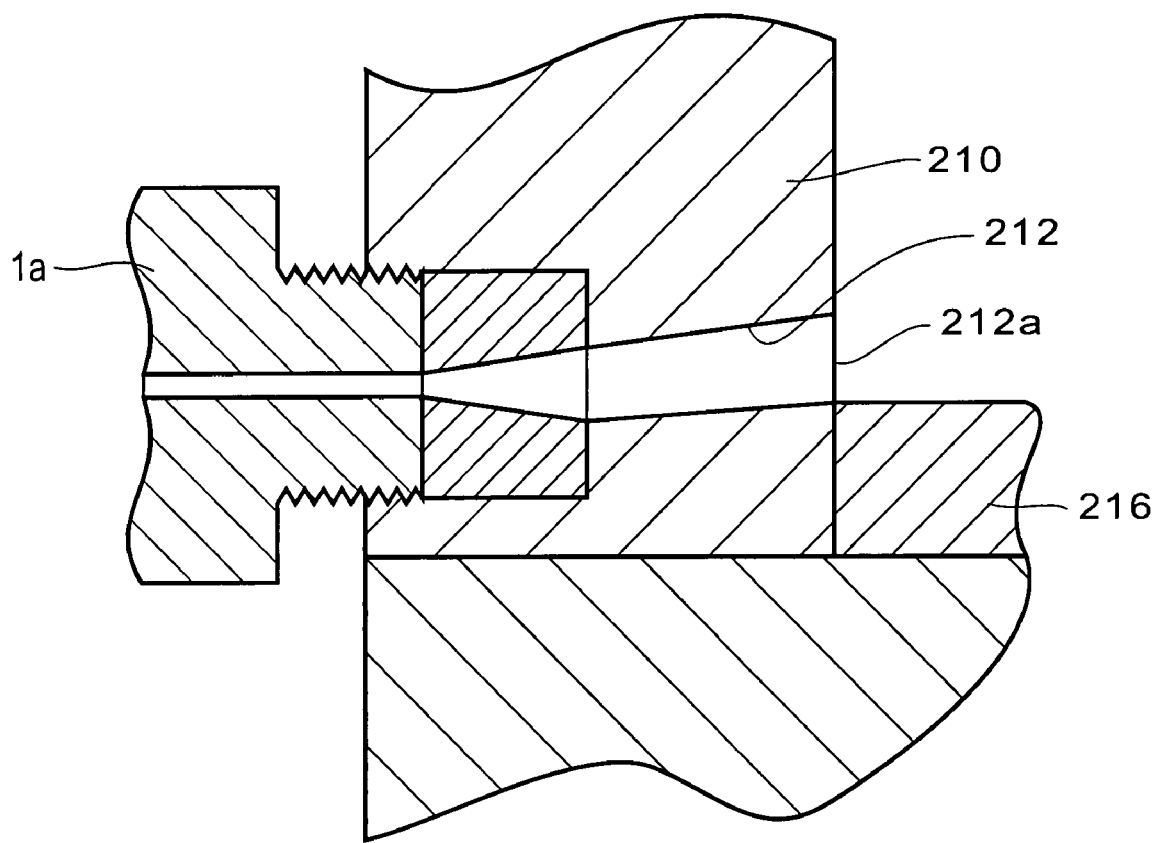
FIG. 8 is a sectional side view that shows a connection structure of a head bubble elimination valve (fluid control valve) with an inlet passage formed on a tilt.

In this exemplary embodiment, the inlet passage 212 is formed, while being elongated in a horizontal direction. However, the inlet passage may also be so formed on a tilt as to look up toward the tank 211, such as, for example, shown in FIG. 8. Thus, forming the inlet passage 212 in such a manner to lay it out on a tilt upward makes it possible to prevent any bubble from being built up in the inlet passage 212.

Furthermore, it may also be possible to form a liquid-affinitive coating on the internal surface of the tank 211 or to directly provide the internal surface itself of the tank 211 with surface treatment to make the internal surface liquid-affinitive. Thus, implementing such a treatment described above makes the internal surface of the tank 211 highly liquid-affinitive to increase wet-ability for the liquid material so that any bubble is unlikely to adhere to the internal surface of the tank relatively, and eventually no bubble is likely to get built up inside the tank 211.

The outlet passage 213 is so placed to lead upward from the tank 211, and then bent into a horizontal direction. However, it is not necessarily needed to bend the outlet passage horizontally, but it may also be possible to form the outlet passage on a tilt so as to look upward while the passage being elongated outward from the tank 211. Thus, forming the outlet passage 213 on a tilt so as to look upward can prevent any bubble from being built up in the outlet passage 213.

The valve plug 222 is made of fluorinated resin, etc. and shaped like a column, being equipped with the open/close part 216 integrated at a side section of the valve plug 222. The valve plug 222 gets lifted and lowered by using a publicly known vertical motion mechanism in order to open and close the outlet port 213a by a tip surface (an upper end surface) of the valve plug. Incidentally, in this embodiment, an air-cylinder mechanism by making use of the air supply section described above is adopted as the vertical motion mechanism. In other words, air flows into the valve plug holding part 223 through a flow passage, which is not illustrated, out of the air supply section in order to lift the valve plug 222 so that the valve plug 222 closes the outlet port 213a, and meanwhile, the open/close part 216 closes the inlet port 212a too at the same time, as shown in FIG. 5(a). Then, if the air supply gets stopped and the supplied air is released under the condition described above, the valve plug 222 is pulled down by forcing power of the spring 224 so that the outlet port 213a becomes opened and the inlet port 212a also gets opened, as shown in FIG. 5(b).

A coupler connecting part of the inlet port side 225 is formed at an external side of the inlet passage 212, i.e., an end opposite from the inlet port 212a. Meanwhile, a coupler connecting part of the outlet port side 226 is formed at an external side of the outlet passage 213, i.e., an end opposite from the outlet port 213a. To the coupler connecting part of the inlet port side 225 an inlet coupler 1a is installed by screwing in the same manner as it is done conventionally. To the coupler connecting port of the outlet port side 226 an outlet coupler 1b also is installed by screwing in the same manner as it is done conventionally. Piping (not illustrated in the drawing) is connected through corresponding coupler 1a or 1b to each of the coupler connecting parts.

Figure 6:
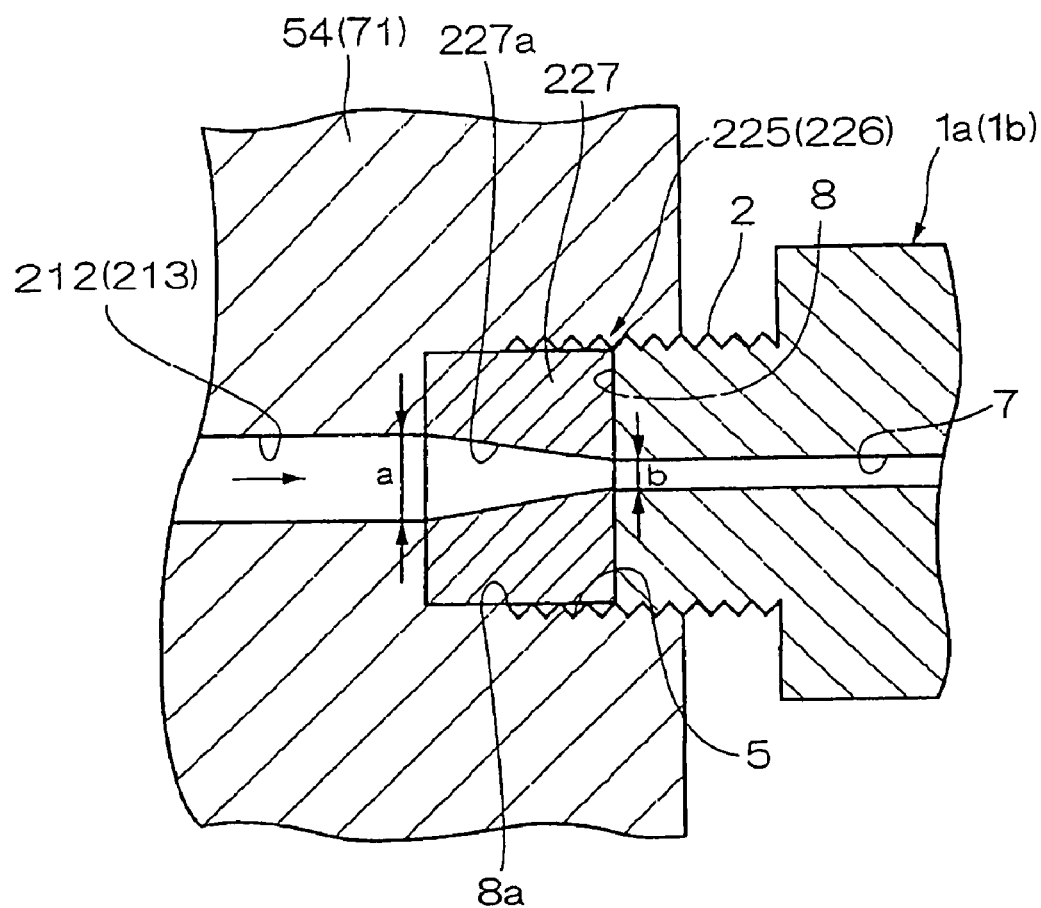
FIG. 6 is an enlarged schematic of a core part of FIG. 5.
Figure 7:
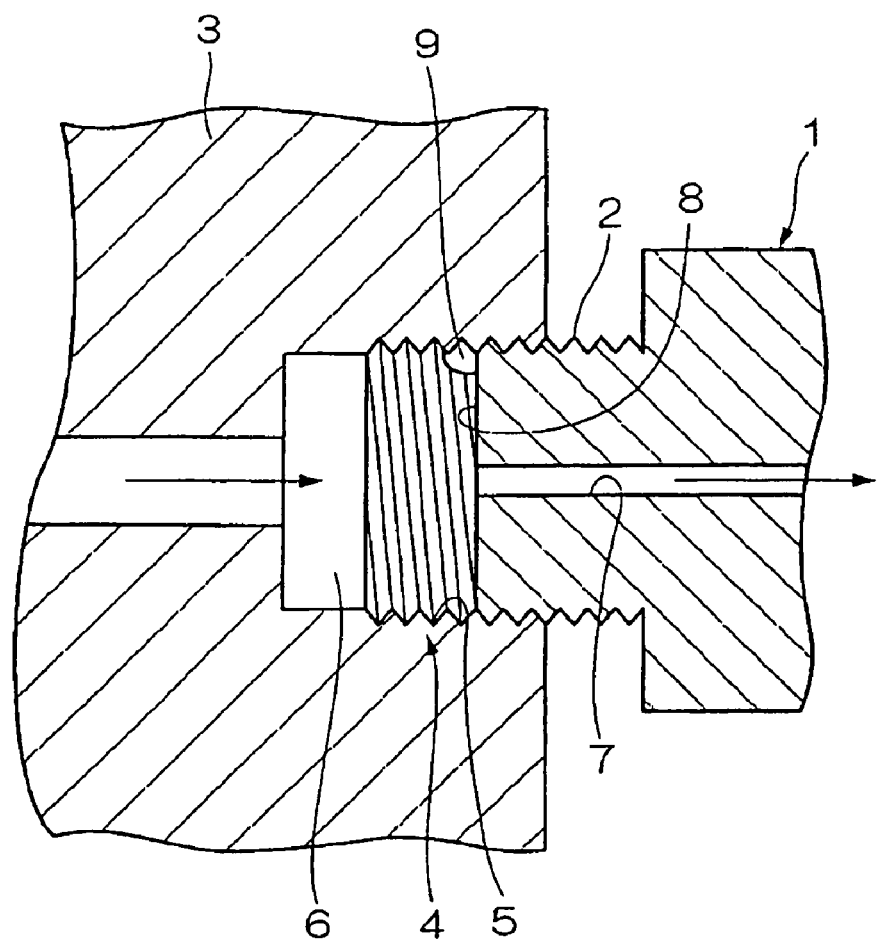
FIG. 7 is a sectional view of a core part to show a connection structure linked to a coupler of a related art fluid control valve.

Then, between each of the coupler connecting parts of the inlet port side 225 as well as the outlet port side 226 and the corresponding coupler 1a or 1b, as shown in FIG. 6, there comes up a space 8a, which is quite different in its inner diameter (passage diameter) from a flow passage diameter "b" of the flow passage 7 of the corresponding coupler 1a or 1b because of the reason described earlier; i.e., a tip of the corresponding coupler 1a or 1b does not get in up to each bottom of the coupler connecting parts of the inlet port side 225, as well as the outlet port side 226. As a result, the large shoulder part 8 is formed between each of the coupler connecting parts of the inlet port side 225 as well as the outlet port side 226 and the flow passage 7 of the corresponding coupler 1a or 1b. Then, according to the present invention, an annular element 227 is placed in the space 8a for the purpose of offsetting the shoulder part 8. By the way, the space 8a can be composed of two sections (i.e., the non-threaded part 6 that cannot become a part of the female screw part 5 because of a manufacturing-wise reason as described above, and a space where the female screw part 5 is formed but the corresponding coupler 1a or 1b does not enter).

The annular element 227 is so designed beforehand as to fit into the space 8a almost with no clearance, and formed to be cylindrical according to the shape of the space 8a. Regarding a material of the annular element 227, there is no specific restriction, and any synthetic resin, rubber, any metal and so on can be used. However, especially when a chemical-proof performance and a sealing performance are taken into consideration, using a synthetic resin is preferred. Especially from a viewpoint of superiority in chemical-proof performance, a fluorinated resin, such as poly-tetra-fluoro-ethylene and so on, poly-acetale (POM), poly-phenylene-sulfide (PPS), and so forth is preferably used as a synthetic resin. Moreover, when any of these synthetic resin materials is used, it is preferable, while taking the sealing performance into account, i.e., for the purpose of providing a function as a packing material as well, that a relatively soft material that can be deformed is used.

Furthermore, as for the annular element 227, if at least a port diameter of a through-hole 227a (inner diameter) at its side of the corresponding coupler 1a or 1b is formed to be almost the same as the flow passage diameter "b" of the flow passage 7 of the corresponding coupler 1a or 1b, there does not appear any shoulder part between the through-hole 227a and the flow passage 7, and therefore, building up any bubble can be avoided. However, still further, it is preferable to make the through-hole 227a tapered because of the reason described below.

As a general rule, a fluid control valve that works as the head bubble elimination valve 54 or the cleaning liquid ON/OFF switching valve 71 is formed so as to have a flow passage diameter "a" (inner diameter) of the inlet passage 212 and/or the outlet passage 213 being different from the flow passage diameter "b" of the corresponding coupler 1a or 1b to be installed. This is because the type of the corresponding coupler 1a or 1b is suitably selected according to the piping to which the coupler is connected. Therefore, it is difficult to determine the flow passage diameter "a" of the inlet passage 212 and/or the outlet passage 213 in advance and manufacture the fluid control valve according to the flow passage diameter "b" of the corresponding coupler 1a or 1b.

If there exist any difference between the flow passage diameter "a" (inner diameter) of the inlet passage 212 and/or the outlet passage 213 and the flow passage diameter "b" of the corresponding coupler 1a or 1b to be connected, making the through-hole 227a of the annular element 227 with a usual constant diameter eventually forms a shoulder part at least between the through-hole 227a of the annular element 227 and the inlet passage 212 and/or the outlet passage 213, and/or between the through-hole 227a and the flow passage 7 of the corresponding coupler 1a or 1b. Therefore, in the annular element 227 of this exemplary embodiment, the through-hole 227a of the annular element is so tapered as to continuously enlarge (or reduce) its diameter between the port of the inlet passage 212 or the outlet passage 213, whose diameter is regarded as "a"; and the port of the corresponding coupler 1a or 1b side, whose diameter is regarded as "b", as described above. According to this structure, there appears no shoulder part between the inlet passage 212 and/or the outlet passage 213 and the flow passage 7 of the corresponding coupler 1a or 1b, and the in-between passage there continuously enlarge (or reduce) its diameter.

In the case of the head bubble elimination valve 54 (or the cleaning liquid ON/OFF switching valve 71) having its structure as described above, turning on the valve stops air supply to the valve plug holding part 223, as already described, in order to pull down the valve plug 222 so that the valve plug 222 is detached from the outlet port 213a to open the outlet port 213a and the inlet port 212a also gets opened at the same time, as shown in FIG. 5(b). As a result, the ink liquid passes through the coupler connecting part of the inlet port side 225 and the inlet passage 212, and still further, it also passes through a space between the valve seat 214 and valve plug 222 to reach the outlet passage 213, and subsequently flows into piping connected to the corresponding coupler 1a or 1b through the coupler connecting part of the outlet port side 226.

At the coupler connecting parts of the inlet port side 225, as well as the outlet port side 226 under the situation described above, any shoulder part that could have been formed due to a difference in the flow passage diameter between each of the coupler connecting parts and the corresponding coupler 1a or 1b is offset by using the annular element 227. Therefore, a phenomenon of building up any bubble, which happens at a shoulder part due to a difference in the flow passage diameter in a conventional method, can be avoided.

Furthermore, since the through-hole 227a of the annular element 227 is tapered as described above, the diameter of the through-hole 227a is continuously enlarged or reduced without any shoulder part between the inlet passage 212 and/or the outlet passage 213 and the flow passage 7 of the corresponding coupler 1a or 1b. Therefore, building up any bubble due to a shoulder part at the coupler connecting parts of the inlet port side 225 as well as the outlet port side 226 can be avoided for sure.

Under the condition, if the annular element 227 is not placed while the side of the droplet ejection head 53 being provided with negative pressure and a bubble built up at the head bubble elimination valve 54 is forcibly sucked, a bubble about 2 cm long flows out in a pipe, whose diameter is 3 mm and which is placed at the outlet side. Meanwhile, if the annular element 227 is placed as described above, only one bubble about 2 mm long flows out. Therefore, it is already confirmed that the annular element 227 has an effect to prevent any bubble from being built up at the coupler connecting parts of the inlet port side 225 as well as the outlet port side 226.

Then, turning off the head bubble elimination valve 54 (or the cleaning liquid ON/OFF switching valve 71) supplies air into the valve plug holding part 223, as already described, in order to lift up the valve plug 222 so that the valve plug 222 is attached to the valve seat 214 to close the outlet port 213a by the valve plug 222, and furthermore at the same time, the inlet port 212a is also closed by the open/close part 216 as shown in FIG. 5(a). Accordingly, flowing in of the ink liquid into the tank 211 as well as flowing out of the ink liquid from the tank 211 into the outlet passage 213 get stopped.

In the case of the head bubble elimination valve 54 (or the cleaning liquid ON/OFF switching valve 71) having its structure as described above, since the coupler connecting parts of the inlet port side 225 as well as the outlet port side 226 are equipped with the annular element 227 to prevent any bubble from being built up at a shoulder part due to a difference in the flow passage diameter, it can be avoided that multiple bubbles get integrated each other to become a larger bubble and eventually flow out. Accordingly, it becomes possible to avoid such inconveniences that, for example, the ejection amount of cleaning liquid for cleaning the droplet ejection head 53 becomes uneven so that a nozzle part of the droplet ejection head 53 is not cleaned enough and eventually a stain may remain at the nozzle part, and therefore, a missing operation of drawing is caused and/or a flying route of ink becomes bent.

Furthermore, if the annular element 227 is made of a synthetic resin that is excellent in chemical-proof performance, the number of fluid types for which the fluid control valve can be adopted as the head bubble elimination valve 54 and/or the cleaning liquid ON/OFF switching valve 71 increases so that the fluid control valve becomes excellent in its general versatility.

Still further, such a synthetic resin shows higher elasticity than any metallic material for example, and therefore, it also demonstrates a function as a sealing component. In other words, if the annular element 227 gets pressed by the corresponding coupler 1a or 1b to become elastically deformed at the time when the corresponding coupler 1a or 1b is connected to the coupler connecting parts of the inlet port side 225 as well as the outlet port side 226, forcing power caused by elastic restoration of the annular element 227 increases the close tightness between the coupler connecting parts of the inlet port side 225 as well as the outlet port side 226 and the corresponding coupler 1a or 1b so that the liquid-tightness (sealing performance) at the connecting parts is heightened.

Furthermore, by making the through-hole 227a of the annular element 227 tapered as described above, building up any bubble due to a shoulder part at the coupler connecting parts of the inlet port side 225 as well as the outlet port side 226 can be avoided for sure, and therefore, it is surely avoided that multiple bubbles get integrated each other to become a larger bubble and eventually flow out. Thus, any missing operation of drawing that is caused due to defective ejection of the liquid material and/or any flying route of the liquid material that becomes bent because of insufficient cleaning around the nozzle part can be avoided.

Moreover, in the case of the fluid control valve described above (i.e., the head bubble elimination valve 54 and the cleaning liquid ON/OFF switching valve 71), the inlet port 212a is positioned to be lower than the outlet port 213a. Accordingly, a fluid flows in through the inlet port 212a that is positioned to be lower than the outlet port 213a, especially when the fluid is initially charged. As a result, any gas such as air residing in the tank 211 flows out through the outlet port 213a that is positioned to be higher than the inlet port 212a, and consequently no bubble gets built up in the tank 211. As a result, any inconvenience to be caused by integration of bubbles built up and an outflow of a consequent large bubble as described above can be avoided.

Furthermore, since the inlet port 212a is positioned at the lowest bottom part of the tank 211, the fluid flows in from the lowest bottom part of the tank 211, and accordingly, there occurs no downward flow of the liquid toward any point lower than the inlet port 212a. Therefore, by making no bubble circulate in the tank 211 while being carried on a downward flow, and making any bubble easily flow toward the outlet port 213a, it is possible to surely prevent any bubble from being built up in the tank 211. Thus, building up any bubble in the tank 211 can be avoided, in addition to the prevention of building up any bubble, as described above, at the coupler connecting parts of the inlet port side 225 as well as the outlet port side 226, and therefore, it is possible to surely prevent or reduce any bubble from being built up in the entire section of the fluid control valve.

Moreover, since the outlet port 213a is positioned almost around the center part of the top surface of the tank 211, any bubble gathered to the top surface of the tank 211 is likely to still gather toward the outlet port 213a, being carried by a flow of the fluid, so that the bubble is likely to flow out of the tank 211, and accordingly not to get built up inside the tank 211.

Furthermore, in the case of the droplet ejection device 10 equipped with the fluid control valve described above (i.e., the head bubble elimination valve 54 and the cleaning liquid ON/OFF switching valve 71), installing the annular element 227 at the coupler connecting parts of the inlet port side 225 as well as the outlet port side 226 in the fluid control valve, as described above, prevents any bubble from being built up at a shoulder part caused by a difference in the flow passage diameter. Therefore, in the droplet ejection head 53, any missing operation of drawing caused by defective ejection of the liquid material and any bend of a flying route of the liquid material caused by insufficient cleaning around the nozzle can be avoided so that quality of initial ejection by the droplet ejection head 53 can be secured sufficiently.

Still further, since it is possible as described above to prevent any bubble from being built up in the fluid control valve, eventually no forcible bubble removing process is required so that maintenance time etc. can be reduced and productivity can be improved.

Further, the technical scope of the invention is not confined to the exemplary embodiment described above, and it is possible to add various modifications as far as they do not deviate from the concept of the present invention.

For example, as for the through-hole 227a of the annular element 227, if the flow passage diameter "a" (inner diameter) of the inlet passage 212 and/or the outlet passage 213 is equal to the flow passage diameter "b" of the corresponding coupler 1a or 1b to be installed, the through-hole 227a is so formed as to have a constant diameter, which is the same as the flow passage diameter "a" (="b"), without making the through hole tapered as a matter of course.

Furthermore, the exemplary embodiment described above shows a sample case, in which a fluid control valve of the present invention is used for a droplet ejection device. However, application of a fluid control valve of the invention is not limited only to a droplet ejection device, but such a fluid control valve can also be applied to various kinds of other fluid control devices too.

What is claimed is:

1. A fluid control valve for use with a fluid, comprising:
a tank through which the fluid passes;
an inlet port, through which the fluid flows into the tank;
an outlet port, through which the fluid flows out of the tank;
a valve plug that opens and closes both the inlet port and the outlet port;
a coupler connecting part of the inlet port side, which is located in an inlet passage connected to the inlet port;
a coupler connecting part of the outlet port side, which is located in an outlet passage connected to the outlet port;
an inlet coupler and an outlet coupler;
a pipe connected to the coupler connecting part of the inlet port side by using the inlet coupler;
a pipe connected to the coupler connecting port of the outlet port side by using the outlet coupler; and
an annular element offsetting a shoulder part caused by a difference in flow passage diameter existing between each of the coupler connecting parts of the inlet port side and the outlet port side, the corresponding inlet or outlet coupler being placed at each of the coupler connecting part of the inlet port side and the coupler connecting part of the outlet port side.

2. The fluid control valve according to claim 1, the annular element being made of synthetic resin.

3. The fluid control valve according to claim 1, the annular element being formed so that, if there exists a difference in flow passage diameter between at least one of the inlet passage and the outlet passage located adjacent to the annular element and the corresponding inlet or outlet coupler assembled into each of the coupler connecting part of the inlet port side and the coupler connecting part of the outlet port side in which the annular element is placed, a through hole of the annular element being continuously tapered to expand or reduce its diameter without forming any shoulder part between the flow passages.

4. The fluid control valve according to claim 1, the inlet port being positioned to be lower than the outlet port.

5. The fluid control valve according to claim 4, the inlet port being positioned at the lowest bottom part of the tank.

6. The fluid control valve according to claim 4, the inlet passage being placed on a tilt so as to face up toward the tank.

7. The fluid control valve according to claim 4, the outlet port being positioned almost around a center part of the top surface of the tank.

8. The fluid control valve according to claim 7, the top surface of the tank being tilted upward to the outlet port so as to be tapered.

9. The fluid control valve according to claim 4, an internal surface of the tank being provided with surface treatment to become liquid-affinitive.

10. The fluid control valve according to claim 4, an internal surface of the tank being provided with chemical polish treatment.

11. A droplet ejection device for use with a liquid material, comprising:
a droplet ejection head equipped with a nozzle to eject the liquid material;
a device to clean an area surrounding the nozzle;
a cleaning liquid supply section to discharge a cleaning liquid into the device to clean;
a first supply flow passage to supply the liquid material to the droplet ejection head;
a second supply flow passage to supply the cleaning liquid to the cleaning liquid supply section; and
a fluid control valve to control the liquid material flowing through the first supply flow passage as well as the cleaning liquid flowing through the second supply flow passage, the fluid control valve being the fluid control valve of claim 1.

* * * * *